United States Patent [19]

Paull

[11] 4,124,017
[45] Nov. 7, 1978

[54] COLLIMATING SOLAR RADIATION COLLECTOR

[75] Inventor: James B. Paull, Andover, Mass.

[73] Assignee: James B. Paull & Co., Inc., Boston, Mass.

[21] Appl. No.: 807,537

[22] Filed: Jun. 17, 1977

[51] Int. Cl.² .................................................. F24J 3/02
[52] U.S. Cl. ..................................... 126/270; 126/271; 350/96.12
[58] Field of Search ................ 126/270, 271; 350/211, 350/213, 96 WG, 286

[56] References Cited

U.S. PATENT DOCUMENTS

| 3,970,070 | 7/1976 | Meyer et al. | 126/271 |
| 3,985,116 | 10/1976 | Kapany | 126/271 |

*Primary Examiner*—Kenneth W. Sprague
*Attorney, Agent, or Firm*—Cooper, Dunham, Clark, Griffin & Moran

[57] ABSTRACT

This invention describes an improved solar energy collector which passively concentrates the rays of the sun. The collector comprises a transparent cover which collimates incident rays of light and directs such collimated sunlight towards an absorbing target wherein the radiation's energy is received and utilized. The transparent collector cover consists of a lamination of transparent plastic or glass elements. Sunlight incident on the cover over a range of angles is reflected internally between the sides of the elements. These elements are so shaped that internal reflections result in the sunlight becoming collimated. Specifically, the elements are curved so that the horizontal distance between the sides of adjacent elements remains constant whereas the length of a normal between the sides increases along the path of incident light. The effect of these apparently diverging surfaces is to cause each subsequent internal reflection at a particular internal surface to occur at a successively lower angle of incidence, thus tending to collimate the light's rays. The resulting collimated rays are then reflected upon leaving the bottom of the collector cover in such a way that they are directed towards the absorbing target.

15 Claims, 3 Drawing Figures

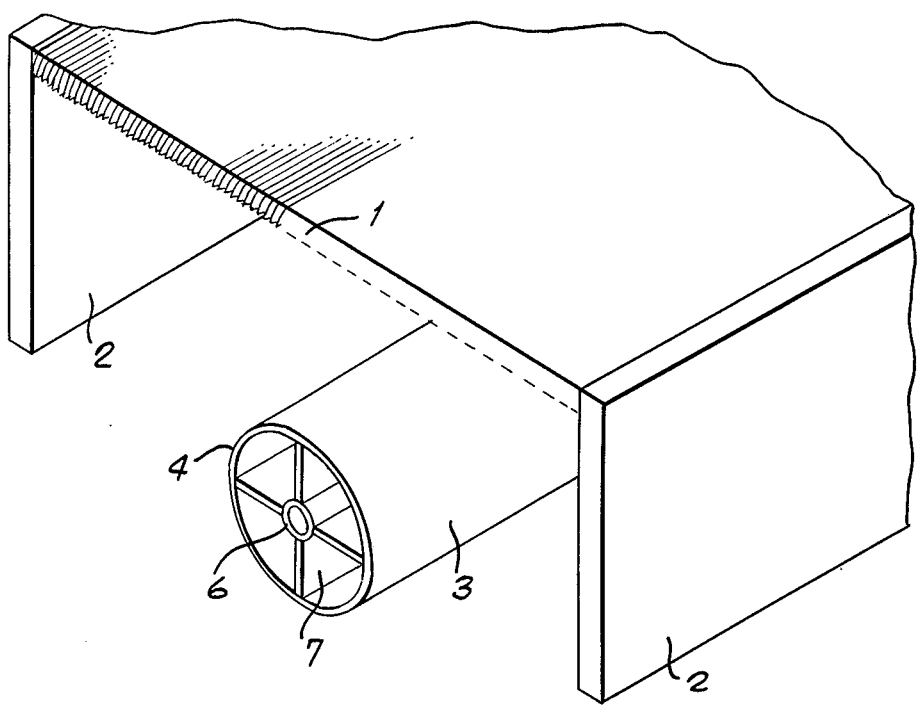
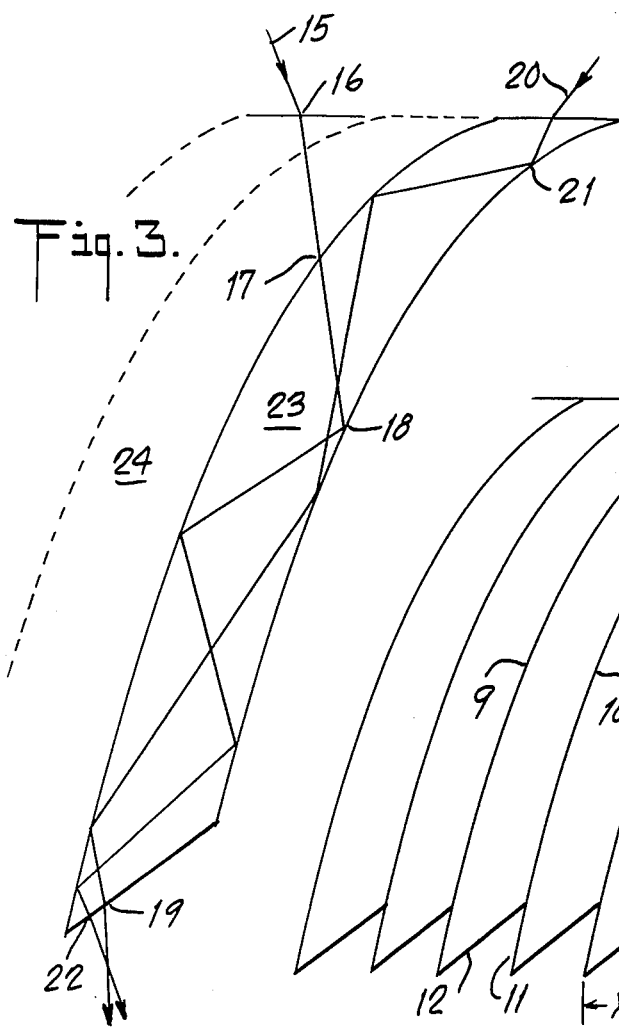
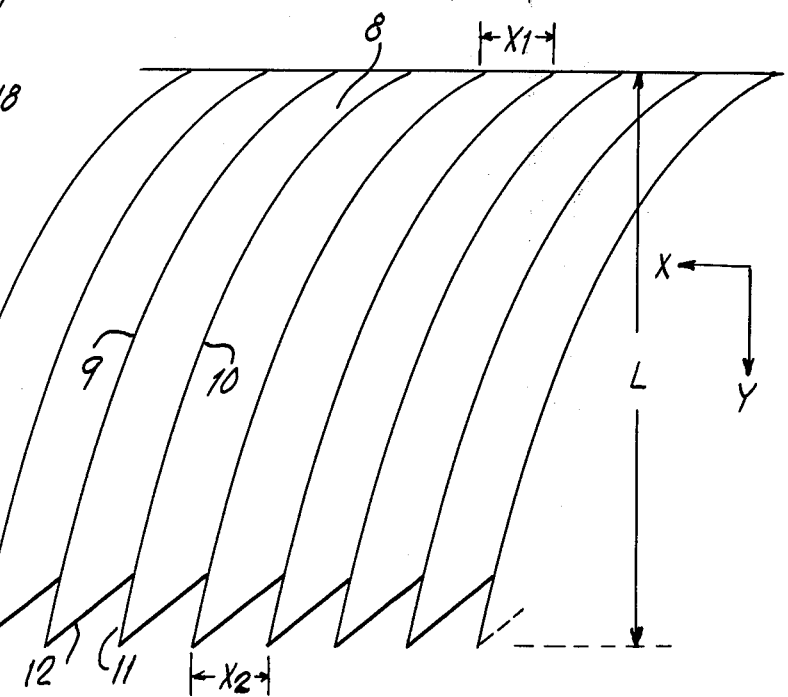

COLLIMATING SOLAR RADIATION COLLECTOR

BACKGROUND OF THE INVENTION

Solar radiation has long been recognized as an energy source with many potential applications. However, until recently the ease of recovery and relatively low cost of fossil fuels have resulted in the postponement of efforts to utilize this virtually limitless and non-polluting energy source. Present concern over the depletion of fossil fuels has now brought about renewed interest in tapping the energy inherent in the sun's radiation.

Flat-plate solar collectors are commonly used for hot water and space heating. However, flat-plate collectors possess certain inherent disadvantages which deter wider application. Specifically, flat-plate collectors lose efficiency as the collector temperature increases over the temperature of the ambient atmosphere. Since the entire upper surface area of the collector is available for transferring heat to the outside, heat loss increases as the temperature of the collector rises. Not only does this heat loss problem reduce the collector's efficiency, it also imposes a practical limit on the temperature to which a fluid interfacing the collector can be raised. Hence, flat-plate collectors have only been used for relatively low temperature heat applications, such as space heating, and have not been suitable for higher temperature fluid applications, such as absorption cooling and other thermodynamic cycles. An additional disadvantage associated with flat-plate collectors is the cost of the relatively large surface area of materials required to absorb incident light.

In order to attain higher temperatures than possible with flat-plate collectors, concentrating collectors have been developed. Such devices concentrate incident solar radiation upon a relatively small absorption area, typically by some type of imaging process. Although higher temperatures have been obtained with such concentrating collectors, they too have certain deficiencies. In particular, in order to capture solar radiation they must at least roughly track the path of the sun. This requires a complicated mechanism for moving the concentrating collector which adds a substantial expense to the overall device and involves regular maintenance and the possibility of mechanical failure. Furthermore, because these concentrating collectors are designed for capturing direct sunlight, much of the diffuse sunlight goes uncollected. As a result, on overcast days, and in northern latitudes where a large percentage of incident sunlight is diffuse, such collectors are not optimally functional.

One solution to the problems inherent with both flat-plate and concentrating collectors is to passively concentrate incident sunlight, both direct and diffuse, without the aid of a tracking mechanism. Several of these non-tracking solar concentrating collectors exist in the prior art, such as those of U.S. Pat. Nos. 3,915,148; 3,923,381; 3,964,464 and 3,780,722. However, unlike the invention disclosed herein, none of these devices collimate the sun's rays which they collect. Such collimation permits improved concentration upon an absorbing target by a simple and relatively inexpensive collector possessing a number of novel and advantageous features as revealed in the following disclosure.

The principal object of this invention is to provide a new and useful device for collecting both direct and indirect sunlight and for concentrating solar energey in amounts sufficient for heating and/or cooling buildings.

It is another object of the invention to provide an improved solar energy collector having a new and useful system of curved, laminated transparent elements for collimating solar radiation and concentrating solar energy by directing collimated radiation upon an absorbing target.

It is a further object of the invention to provide an improved device for concentrating solar energy which does not require an expensive and complicated tracking mechanism.

SUMMARY OF THE INVENTION

The invention, accordingly, comprises one or more transparent collecting covers, each formed from thin strips of a transparent material, such as acrylic or glass. These strips of transparent material, hereinafter called elements, are laminated together. In section, the long edges of the elements, curved in the form of a parabloid, are contiguous. Their length coincides with the thickness of the cover. The short edge of the element, again in section, is flat on its upper surface and coincides with the upper surface of the collecting cover. The bottom edge of the element is sharply angled in order to refract collimated light in the direction of an absorbing target. Positioned below the collecting cover in a position to receive the concentrated solar radiation is it is refracted from the lower angled edge of the cover is an absorbing target capable of transforming the radiation into thermal or some other form of energy.

Solar radiation incident upon the upper edge of the collecting cover at an angle less than the critical angle for the material of which the cover is composed enters the elements. It is reflected downward from the upper surface by the edges of the elements and collimated because of the shape of the elements. The resulting collimated solar radiation is refracted upon leaving the angled bottom edge of the element and directed towards the absorbing target.

BRIEF DESCRIPTION OF THE DRAWINGS

FIG. 1 is an isometric view of a representative solar energy collector assembly, including transparent collecting cover, supports, and absorbing device.

FIG. 2 is a section through the collecting cover, showing the general arrangement of the contiguous elements.

FIG. 3 is an expanded view, in section, of one element showing several possible paths of light.

SPECIFIC DESCRIPTION OF THE INVENTION

Referring to the several drawings in detail, FIG. 1 shows a representative solar energy collector assembly comprising a transparent collecting cover 1, base supports 2 upon which said cover is mounted, and a solar absorbing device 3 such as exists in the art. It is possible to utilize a wide range of absorber designs. This particular design is merely set forth by way of example. In the design shown, absorber 3 consists of a cylindrical glass outer surface 4 which admits the collimated solar radiation directed upon the absorber from the lower surface of the cover and prevents heat loss from the collector, metal surfaces 7 which absorb the solar radiation and convert it to thermal energy, and metal conduit 6 to which said metal surfaces are attached. Conduit 6 functions to carry a fluid which receives and transports the collected thermal energy.

Cover 1 and absorber 3 function optimally when aligned along a North-South axis. Solar radiation incident upon the cover is collimated and refracted upon leaving the bottom surface of the cover in such a way that the collimated sunlight is directed upon absorber 3.

It is known that light incident upon one of two converging reflective surfaces reflects between the surfaces such that the angle of incidence increases for each subsequent reflection. Conversely, the angle of incidence of light reflecting between two diverging surfaces progressively decreases, such reflected light tending to approach the angle of a line equidistant from the two surfaces. The number of reflections between surfaces can be increased if the diverging surfaces are curved, since light travels in a straight path. As a result, the light is collimated between the diverging surfaces.

In the presently preferred embodiment of this invention, the curved diverging surfaces used to collimate the light are the sides of a solid transparent element composed of a material such as acrylic or glass. The collimation is effected by internal reflections of light from the sides of the element.

To better understand this phenomenon reference is made to FIG. 2, a sectional view through the collecting cover, which depicts a plurality of contiguous elements 8. Elements 8 are curved and of constant thickness, i.e. the distance between the surfaces 9 and 10 of element 8 is constant ($X1=X2$). Because of the curved shape, however, a normal from a point on the surface of one side of the element to the other side of the same element increases as said point on the surface becomes more distant from the upper surface of the element along the Y-axis. Thus, light entering a particular element 8 will be reflected internally within the element by sides 9 and 10. Each subsequent reflection from a side will occur at a lower angle of incidence, thereby collimating the light.

There are several general considerations regarding the shape and dimensions of the elements. As mentioned above, the elements should be of constant width ($X1=X2$) along the X-axis. The greater the variation from constant width the greater the curvature in the cover and the poorer the performance of the collector.

The shape of sides 9 and 10 of the elements are of the general form $Y = X^n$, $X \geq 0$. Practical limitations suggest an $n \geq 1.7$, with the best performance in the range $2 \leq n \leq 3.5$. Practical considerations also suggest that the initial X be chosen for the curve such that $0 \leq dy/dx \leq 1.3$.

The maximum slope, s, of the curve of the long edge should be such that $s > 8$. Such a steep slope is necessary to insure that light incident on the sides of the elements at high incident angles reaches a point where the incident angle is less than the critical angle of the material, at which point the light is reflected internally.

Another important consideration in the design of the shape of the elements is the ratio of length L to width X1. This ratio is important for two reasons. First, L/X1 must be large enough to cause a number of reflections sufficient to achieve a satisfactory degree of light collimation. Secondly, L/X1 must be large enough so that incident light cannot pass through the element without being reflected at least once by the sides of the element.

The sharp angle of bottom edge 12 of the elements 8 serves three functions. In element 8, for example, the angle of edge 12 ensures that light or solar energy is ultimately reflected from surface 9 before leaving element 8. For this to occur, the angle of edge 12 should approximate the range of angles of the light being reflected from surface 10 at about the bottom of element 8. Without providing this geometry, collimated light is generally reflected in two directions: from surface 9 and from surface 10. With this geometry a very high percentage of the total light is ultimately reflected from surface 9.

The second function of angled edge 12 is to refract the light emanating from the bottom of element 8 so that there is little interference with the lower edge of adjoining element 11.

The third function of angled bottom edge 12 is to refract the collimated light towards an absorbing target. The angle of edge 12 can be increased to varying angles above that necessary to eliminate interference and to direct the collimated light from the element toward the target.

Light incident at an angle on the surface of cover 1 will be refracted to a steeper angle as it passes into a more dense medium. For purposes of illustrating, consider sunlight incident over a range of 90 degrees, corresponding to the range of the apparent motion of the sun over a period of approximately (6) hours. Assuming the material of the cover is acrylic with a refractive index of 1.49, the total range of angular incidence is reduced to a total of 54° upon entering the cover.

FIG. 3 depicts two of the many possible paths of light through the elements of collecting cover 1. In one example, a path of light 15 enters cover 1 at 16 and is refracted to a steeper angle. At 17, the light reaches the side of particular element 24. As the angle of incidence with the side is greater than the critical angle of the material for internal reflection, the light passes through the interface between the elements into adjoining reflective element 23. At the opposite edge of element 23, the angle of incidence at 18 is less than the critical angle, and the light is reflected internally. The light continues to be reflected internally between the sides of element 23, until it exits the element and is refracted at 19.

As a second example, light path 20 enters cover 1 and is refracted. Upon reaching the side of particular element 23 at 21, the angle of incidence is less than the critical angle, and the light is reflected internally. As in the previous example, the light continues to be reflected internally until it exits element 23 and is refracted at 22.

Other configurations of the device of this invention are possible. More than one collecting cover may be used to increase efficiency. Light collimated in an upper collecting cover then enters a second collecting cover below, where further collimation is achieved. The lower edges of the last of a series of collecting covers are angled to refract the light to the target.

In another embodiment of the invention, light is not refracted to the absorbing target by the lower edges of the collecting cover. Instead, the collimated light is reflected to the target by a reflecting surface below the collector.

In a further embodiment of the invention, the surface of the collector cover is angled such that the side edges of the elements can be described by the curves $Y=X^n$ and $(y-r)=X^n$, where r is the vertical rise of the surface of the collector with respect to the width of an element X1.

In still another embodiment of the invention a reflective material is placed at the interface of the elements. Collimation then no longer depends on internal reflections within the elements but results from simple reflections from adjacent reflective surfaces.

As would be clear to anyone skilled in the art, various other design and structural changes may be made in the invention without departing from the spirit and scope thereof.

I claim:

1. A collimating solar radiation collector comprising:
   a. a transparent cover consisting of a plurality of contiguous laminated elements, said elements being curved so that the horizontal distance between the sides of adjacent elements remains substantially constant while the length of a normal between the sides increases along the path of incident light and so as to collimate sunlight incident upon said cover and direct the resulting collimated sunlight in a desired direction;
   b. an absorbing target upon which said collimated sunlight is directed and wherein solar energy is transformed to thermal energy; and
   c. a means for supporting said cover with respect to said absorbing target for the purpose of receiving said collimated light.

2. A collimating solar radiation collector of claim 1 wherein said elements are composed of glass.

3. A collimating solar radiation collector of claim 1 wherein said elements are composed of acrylic.

4. A collimating solar radiation collector of claim 1 wherein the side edges of said elements are of a curved shape of the general form $Y = X^n$ ($X \geq 0$), the maximum slope of the curve of the long edge of said elements is greater than 8, and the bottom edge of said elements is angled.

5. A collimating solar radiation collector in accordance with claim 4 wherein $n \geq 1.7$.

6. A collimating solar radiation collector in accordance with claim 4 wherein $2 \leq n \geq 3.5$.

7. A collimating solar radiation collector in accordance with claim 4 wherein the initial X chosen for the curve is such that $0 \leq dy/dx \geq 1.3$.

8. A transparent cover consisting of a plurality of contiguous laminated transparent elements, said elements being curved so that the horizontal distance between the sides of adjacent elements remains substantially constant while the length of a normal between the sides increases along the path of incident light and so as to collimate sunlight incident upon said cover and direct the resulting collimated sunlight in a desired direction.

9. A transparent cover in accordance with claim 8 wherein said elements are composed of glass.

10. A transparent cover in accordance with claim 8 wherein said elements are composed of acrylic.

11. A transparent cover in accordance with claim 8 wherein the side edges of said elements are of a curved shape of the general form $Y = X^n$ ($X \geq 0$), the maximum slope of the curve of the long edge of said elements is greater than 8, and the bottom edge of said elements is angled.

12. A transparent cover in accordance with claim 11 wherein $n \geq 1.8$.

13. A transparent cover in accordance with claim 11 wherein $2 \leq n \leq 3.5$.

14. A transparent cover in accordance with claim 11 wherein the initial X chosen for the curve is such that $0 \leq dy/dx \leq 1.3$.

15. A transparent cover in accordance with claim 8 wherein the elements are separated by a reflective material interposed beween the surfaces of the contiguous laminated transparent elements.

* * * * *

UNITED STATES PATENT AND TRADEMARK OFFICE
CERTIFICATE OF CORRECTION

PATENT NO. : 4,124,017
DATED : November 7, 1978
INVENTOR(S) : James B. Paull

It is certified that error appears in the above-identified patent and that said Letters Patent are hereby corrected as shown below:

Column 2, line 20, the word "reflected" should read --refracted--;

Column 2, line 28, the word "is" should read --as--;

Claim 6, Column 6, line 2, before 3.5, the symbol "$\geq$" should read --$\leq$--;

Claim 7, Column 6, line 5, before 1.3, the symbol "$\geq$" should read --$\leq$--.

Signed and Sealed this

Twentieth Day of February 1979

[SEAL]

Attest:

RUTH C. MASON
Attesting Officer

DONALD W. BANNER
Commissioner of Patents and Trademarks